(12) United States Patent
Morikawa et al.

(10) Patent No.: US 9,299,033 B2
(45) Date of Patent: Mar. 29, 2016

(54) METHOD AND APPARATUS FOR DETECTING ABNORMAL TRANSITION PATTERN

(71) Applicant: FUJITSU LIMITED, Kawasaki-shi, Kanagawa (JP)

(72) Inventors: Hiroaki Morikawa, Kawasaki (JP); Tatsuya Asai, Kawasaki (JP); Shinichiro Tago, Shinagawa (JP); Takashi Katoh, Yokohama (JP); Hiroya Inakoshi, Tama (JP); Nobuhiro Yugami, Minato (JP)

(73) Assignee: FUJITSU LIMITED, Kawasaki (JP)

( * ) Notice: Subject to any disclaimer, the term of this patent is extended or adjusted under 35 U.S.C. 154(b) by 238 days.

(21) Appl. No.: 13/859,974

(22) Filed: Apr. 10, 2013

(65) Prior Publication Data
US 2013/0325761 A1 Dec. 5, 2013

(30) Foreign Application Priority Data
Jun. 1, 2012 (JP) .................................. 2012-126438

(51) Int. Cl.
*G06N 5/02* (2006.01)
*G06N 99/00* (2010.01)
(Continued)

(52) U.S. Cl.
CPC .......... *G06N 99/005* (2013.01); *G06K 9/00785* (2013.01); *G06N 5/025* (2013.01); *G06Q 10/0637* (2013.01); *G08G 1/0112* (2013.01); *G08G 1/0129* (2013.01); *G08G 1/20* (2013.01)

(58) Field of Classification Search
None
See application file for complete search history.

(56) References Cited

U.S. PATENT DOCUMENTS 8,429,165 B1 * 4/2013 Jung et al. ...................... 707/737
2003/0117279 A1 * 6/2003 Ueno et al. ..................... 340/523
(Continued)

FOREIGN PATENT DOCUMENTS

JP 2001-516107 9/2001
JP 2007-48277 2/2007
(Continued)

OTHER PUBLICATIONS

Lee, W. et al. "Adaptive intrusion detection: A data mining approach." Artificial Intelligence Review 14.6 (2000): pp. 533-567.*
(Continued)

*Primary Examiner* — Stanley K Hill
*Assistant Examiner* — Benjamin Buss
(74) *Attorney, Agent, or Firm* — Staas & Halsey LLP

(57) ABSTRACT

A method for detecting an abnormal transition pattern from a transition pattern includes: first extracting an episode pattern with an appearance frequency greater than or equal to a first frequency from an episode pattern represented with a description form so as to include a first transition pattern and a second transition pattern differing in an order of a part of items from the first transition pattern to have a complementary relation thereto; second extracting a third transition pattern with an appearance frequency greater than or equal to a second frequency from the transition pattern; and specifying a transition pattern other than the third transition pattern from transition patterns included in the extracted episode pattern, and determining an abnormal transition pattern based on the transition pattern specified in the specifying when the third transition pattern includes a fourth transition pattern corresponding to the extracted episode pattern in the first extracting.

15 Claims, 15 Drawing Sheets

(51) Int. Cl.
*G08G 1/00* (2006.01)
*G06Q 10/06* (2012.01)
*G08G 1/01* (2006.01)
*G06K 9/00* (2006.01)

(56) References Cited

U.S. PATENT DOCUMENTS

2006/0053219 A1* 3/2006 Kutsumi et al. ............... 709/224
2007/0011722 A1   1/2007 Hoffman et al.
2010/0211192 A1* 8/2010 Stluka et al. .................. 700/12
2014/0201133 A1* 7/2014 Kawabata ..................... 707/609

FOREIGN PATENT DOCUMENTS

JP        2010-9112      1/2010
WO        WO 99/13427    3/1999

OTHER PUBLICATIONS

Luo, J. et al. "Fuzzy Frequent Episodes for Real-time Intrusion Detection." FUZZ-IEEE. (2001): 4 pages.*

Blanchard, J. et al. "Assessing the interestingness of temporal rules with Sequential Intensity", Studies in Computational Intelligence (SCI) 127, pp. 55-71. (2008).*

Heikki Mannila et al., "Discovery of Frequent Episodes in Event Sequences", Data Mining and Knowledge Discovery 1, (1997), pp. 259-289.

Rakesh Agrawal et al., "Mining Sequential Patterns", IEEE, (1995), pp. 3-14.

* cited by examiner

FIG. 2

<SET T OF TRAJECTORY DATA>

| ID | POSITIONAL DATA Pos (LATITUDE, LONGITUDE) |
|---|---|
| $t_1$ | (36.25,137.55),(36.08,137.71),(35.93,137.91), (35.83,137.95),(35.57,138.29) |
| $t_2$ | ... |
| ⋮ | ⋮ |
| $t_4$ | (36.30,137.77),(36.28,138.03),(36.22,138.22) ,(35.78,138.37),(35.23,138.39) ,(35.79,138.21),(35.81,138.11) |
| ⋮ | ⋮ |
| $t_8$ | ... |

FIG. 11A $$\begin{Bmatrix} t_1 = ADEHI \\ t_2 = ADEFI \\ t_3 = ABEFI \\ t_4 = ABCFIFE \\ t_5 = HGD \\ t_6 = HEFCB \\ t_7 = HIFCB \\ t_8 = HEFC \end{Bmatrix}$$

SET S OF SEQUENTIAL DATA

EXECUTE FREQUENT EPISODE MINING WITH
FREQUENCY THRESHOLD VALUE OF $\gamma = 2\alpha + \beta = 4$,
EXECUTE FREQUENT SEQUENTIAL PATTERN MINING
WITH FREQUENCY THRESHOLD VALUE OF $\delta = \alpha + \beta = 3$
WHEREIN $\alpha = 1$ AND $\beta = 2$.

FIG. 11B

<RESULTS OF FREQUENT EPISODE MINING>

| J | FREQUENCY |
|---|---|
| A→{E, I} | 4 |
| A→{E, F} | 3 |
| A→{I, F} | 3 |
| A→{F, C} | 3 |
| A→{E, B} | 2 |
| A→{I, B} | 2 |
| ⋮ | ⋮ |
| A→{D, H} | 1 |
| A→{E, H} | 1 |
| A→{F, C} | 1 |
| D→{E, H} | 1 |
| F→{E, I} | 1 |

FIG. 11C

<RESULTS OF FREQUENT SEQUENTIAL PATTERN MINING>

| K | FREQUENCY |
|---|---|
| A→E→I | 3 |
| A→F→I | 3 |
| H→F→C | 3 |
| A→D→E | 2 |
| D→E→I | 2 |
| E→F→C | 2 |
| ⋮ | ⋮ |
| A→D→H | 1 |
| A→I→E | 1 |
| D→E→F | 1 |
| E→F→B | 1 |
| H→I→C | 1 |
| I→F→B | 1 |

<RESULTS OF FREQUENT EPISODE MINING>

| J | FRE-QUENCY |
|---|---|
| A→{E, I} | 4 |
| A→{E, F} | 3 |
| A→{I, F} | 3 |
| A→{F, C} | 3 |
| A→{E, B} | 2 |
| A→{I, B} | 2 |
| ⋮ | ⋮ |
| A→{D, H} | 1 |
| A→{E, H} | 1 |
| A→{F, C} | 1 |
| D→{E, H} | 1 |
| F→{E, I} | 1 |

<RESULTS OF FREQUENT SEQUENTIAL PATTERN MINING>

| K | FRE-QUENCY |
|---|---|
| A→E→I | 3 |
| A→F→I | 3 |
| H→F→C | 3 |
| A→D→E | 2 |
| D→E→I | 2 |
| E→F→C | 2 |
| ⋮ | ⋮ |
| A→D→H | 1 |
| A→I→E | 1 |
| D→E→F | 1 |
| E→F→B | 1 |
| H→I→C | 1 |
| I→F→B | 1 |

<COMPLEMENTARY SEQUENTIAL PATTERN PAIR>

| k | kc |
|---|---|
| A→E→I | A→I→E |

FIG. 15A
<COMPLEMENTARY SEQUENTIAL PATTERN PAIR>
| k | kc |
|---|---|
| A→E→I | A→I→E |
FIG. 15B
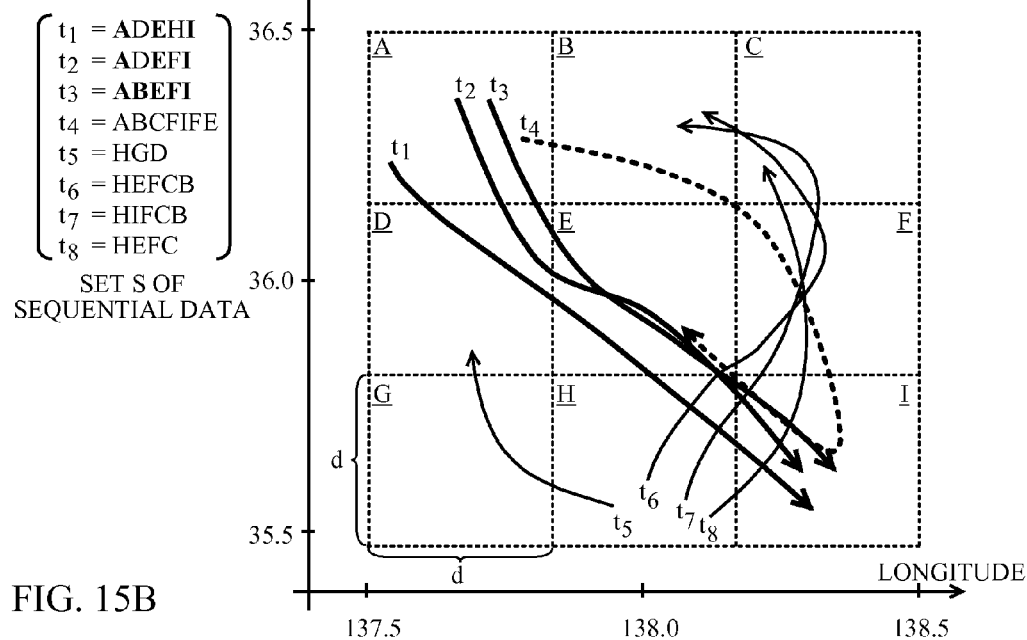
$\begin{Bmatrix} t_1 = ADEHI \\ t_2 = ADEFI \\ t_3 = \mathbf{ABEFI} \\ t_4 = ABCFIFE \\ t_5 = HGD \\ t_6 = HEFCB \\ t_7 = HIFCB \\ t_8 = HEFC \end{Bmatrix}$
SET S OF SEQUENTIAL DATA
<SET OF PAIRS OF NORMAL TRAJECTORY AND ABNORMAL TRAJECTORY>
| ID normal | ID abnormal |
|---|---|
| $t_1, t_2, t_3$ | $t_4$ | ation processing system in accordance with an embodiment;

METHOD AND APPARATUS FOR DETECTING ABNORMAL TRANSITION PATTERN

CROSS-REFERENCE TO RELATED APPLICATION

This application is based upon and claims the benefit of priority of the prior Japanese Patent Application No. 2012-126438, filed on Jun. 1, 2012, the entire contents of which are incorporated herein by reference.

FIELD

A certain aspect of embodiments described herein relates to a method and an apparatus for detecting an abnormal transition pattern.

BACKGROUND

Various methods have been conventionally studied to detect trajectory data different from the others from large quantities of trajectory data in traffic field, or to detect a trail pattern different from the others from a great deal of operation trail logs in BPM (Business Process Management) field.

The above described detection may be achieved by a method that represents trajectory data or tail log with sequential data that defines an order of items, and detects abnormal sequential data based on appearance frequencies of sequential patterns that are combinations of items appearing in the sequential data as disclosed in R. Agrawal and R. Srikant, Mining Sequential Patterns, IEEE '95 (Non-Patent Document 1).

SUMMARY

According to an aspect of the present invention, there is provided a method for detecting an abnormal transition pattern from a transition pattern representing an order of items, the method including: first extracting an episode pattern with an appearance frequency greater than or equal to a first frequency from an episode pattern represented with a description form so as to include a first transition pattern and a second transition pattern, the second transition pattern differing in an order of a part of items from the first transition pattern to have a complementary relation to the first transition pattern; second extracting a third transition pattern with an appearance frequency greater than or equal to a second frequency from the transition pattern; and specifying a transition pattern other than the third transition pattern extracted in the second extracting from transition patterns included in the episode pattern extracted in the first extracting, and determining an abnormal transition pattern based on the specified transition pattern when the third transition pattern extracted in the second extracting includes a fourth transition pattern corresponding to the episode pattern extracted in the first extracting.

According to an aspect of the present invention, there is provided a computer readable medium storing a program causing a computer to execute a process for detecting an abnormal transition pattern from a transition pattern representing an order of items, the process including: extracting an episode pattern with an appearance frequency greater than or equal to a first frequency from an episode pattern represented with a description form so as to include a first transition pattern and a second transition pattern, the second transition pattern differing in an order of a part of items from the first transition pattern to have a complementary relation to the first transition pattern; extracting a third transition pattern with an appearance frequency greater than or equal to a second frequency from the transition pattern; and specifying a transition pattern other than the third transition pattern extracted in the second extracting from transition patterns included in the episode pattern extracted in the first extracting, and determining an abnormal transition pattern based on the specified transition pattern when the third transition pattern extracted in the second extracting includes a fourth transition pattern corresponding to the episode pattern extracted in the first extracting.

According to an aspect of the present invention, there is provided an apparatus for detecting an abnormal transition pattern from a transition pattern representing an order of items, the apparatus including: a first extracting unit that extracts an episode pattern with an appearance frequency greater than or equal to a first frequency from an episode pattern represented with a description form so as to include a first transition pattern and a second transition pattern, the second transition pattern differing in an order of a part of items from the first transition pattern to have a complementary relation to the first transition pattern; a second extracting unit that extracts a third transition pattern with an appearance frequency greater than or equal to a second frequency from the transition pattern; and a determination unit that specifies a transition pattern other than the third transition pattern extracted by the second extracting unit from transition patterns included in the episode pattern extracted by the first extracting unit and determines an abnormal transition pattern based on the specified transition pattern when the third transition pattern extracted by the second extracting unit includes a fourth transition pattern corresponding to the episode pattern extracted by the first extracting unit.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 2 is a diagram illustrating a set T of trajectory data.

FIG. 11A through FIG. 11C are diagrams for explaining the process executed by the frequency mining unit;

FIG. 15A and FIG. 15B are diagrams for explaining the process executed by the abnormal trajectory determination unit.

DESCRIPTION OF EMBODIMENTS

The method of Non-Patent Document 1 first detects a sequential pattern with a high appearance frequency, and checks appearance frequencies of sequential patterns having a different order of the items included in the sequential pattern with a high appearance frequency. Then, sequential data including a sequential pattern with a lower appearance frequency among the sequential patterns having the different order of the items is decided as abnormal data.

However, the method of Non-Patent Document 1 needs to check even a disinterested sequential pattern, and thus is inefficient because appearance frequencies of all sequential patterns having a different order of items in each sequential data are to be checked.

Figure 1:
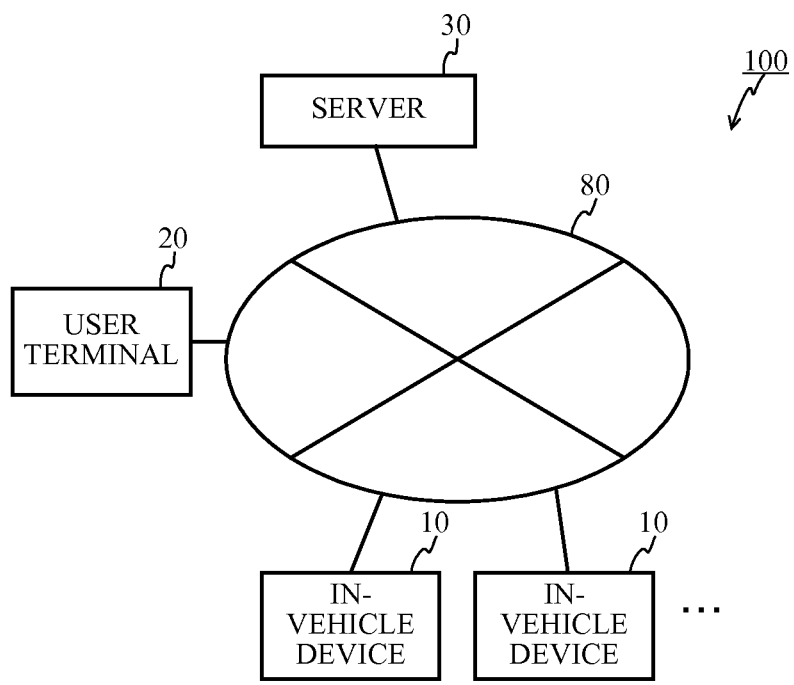
FIG. 1 schematically illustrates a configuration of an information processing system in accordance with an embodiment.

Hereinafter, a description will be given of an embodiment with reference to FIG. 1 through FIG. 15B. FIG. 1 schematically illustrates a configuration of an information processing system 100 in accordance with the embodiment.

As illustrated in FIG. 1, the information processing system 100 includes in-vehicle devices 10, a user terminal 20, and a server 30. The in-vehicle devices 10, the user terminal 20, and the server 30 are connected to a network 80 such as the Internet.

The in-vehicle device 10 is a device mounted in a vehicle such as a taxi and includes a GPS module and a communication device. The in-vehicle device 10 acquires positional data of the vehicle at predetermined time intervals with the GPS module, and transmits the acquired positional data to the user terminal 20 with the communication device. The positional data has four attributes (time, ID, latitude, longitude).

Figure 3:
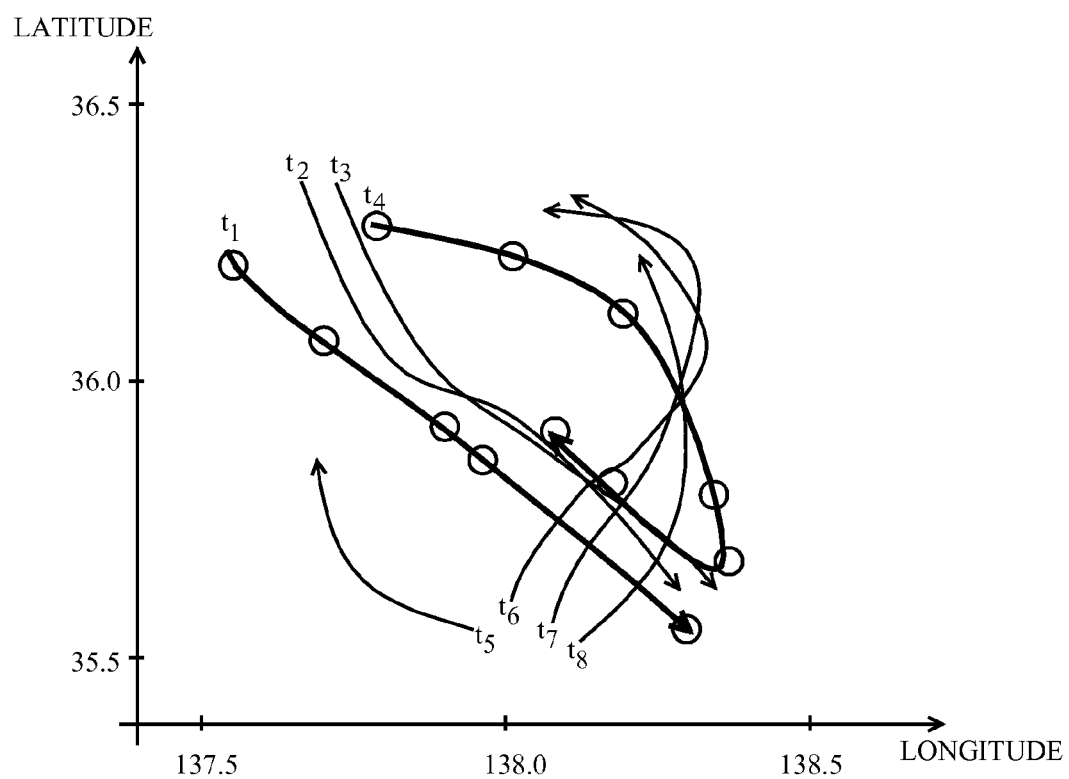
FIG. 3 is a diagram that plots positional data Pos in FIG. 2 on a coordinate plane and connects the positional data Pos in order of acquisition time.

The user terminal 20 is a terminal such as a PC (Personal computer) placed in, for example, a taxi company, and collects positional data of vehicles transmitted from the in-vehicle devices 10. The user terminal 20 then organizes the positional data of the vehicles, creates a set T of trajectory data illustrated in FIG. 2, and transmits it to the server 30. The set T of trajectory data in FIG. 2 has fields for an ID and positional data Pos (latitude, longitude). The field for the ID stores an ID of trajectory (corresponding to an ID of the vehicle for example). The field for the positional data Pos (latitude, longitude) stores information about latitude and longitude in order of acquisition time. FIG. 3 plots the positional data Pos in FIG. 2 on a coordinate plane, and connects the positional data Pos in order of acquisition time.

Back to FIG. 1, the server 30 executes a process for determining an abnormal trajectory from the set T of trajectory data transmitted from the user terminal 20 based on the request from the user terminal 20. The server 30 outputs the processing results to the user terminal 20. The present embodiment describes trajectory of a small number of vehicles (e.g. one vehicle) that passes locations $X_1$, $X_2$, and $X_3$ in order of, for example, $X_1 \to X_3 \to X_2$ although a large number of vehicles pass the locations in order of $X_1 \to X_2 \to X_3$ as an "abnormal trajectory".

Figure 4:
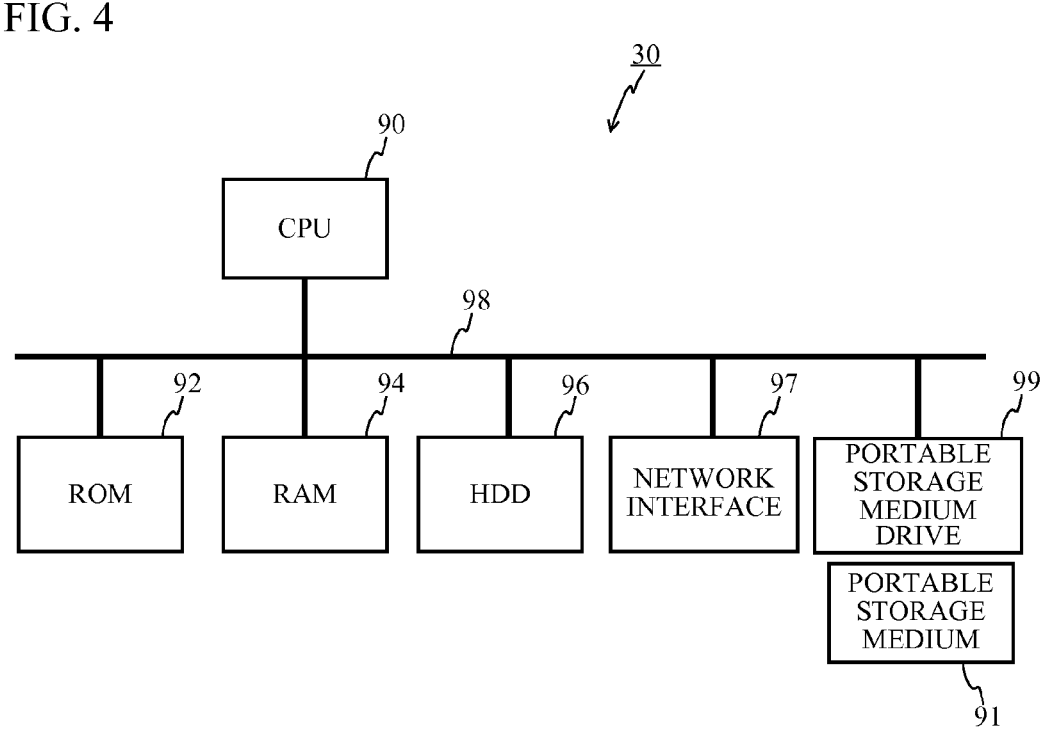
FIG. 4 illustrates a hardware configuration of a server.

FIG. 4 illustrates a hardware configuration of the server 30. As illustrated in FIG. 4, the server 30 includes a CPU 90, a ROM 92, a RAM 94, a storing unit (HDD (Hard Disk Drive) in this embodiment) 96, and a portable storage medium drive 99, and each of them is connected to a bus 98. The server 30 achieves a function of each unit in FIG. 5 by executing, by the CPU 90, a program (abnormal transition pattern detection program) stored in the ROM 92 or the HDD 96, or a program (abnormal transition pattern detection program) read out from a portable storage medium 91 by the portable storage medium drive 99.

Figure 5:
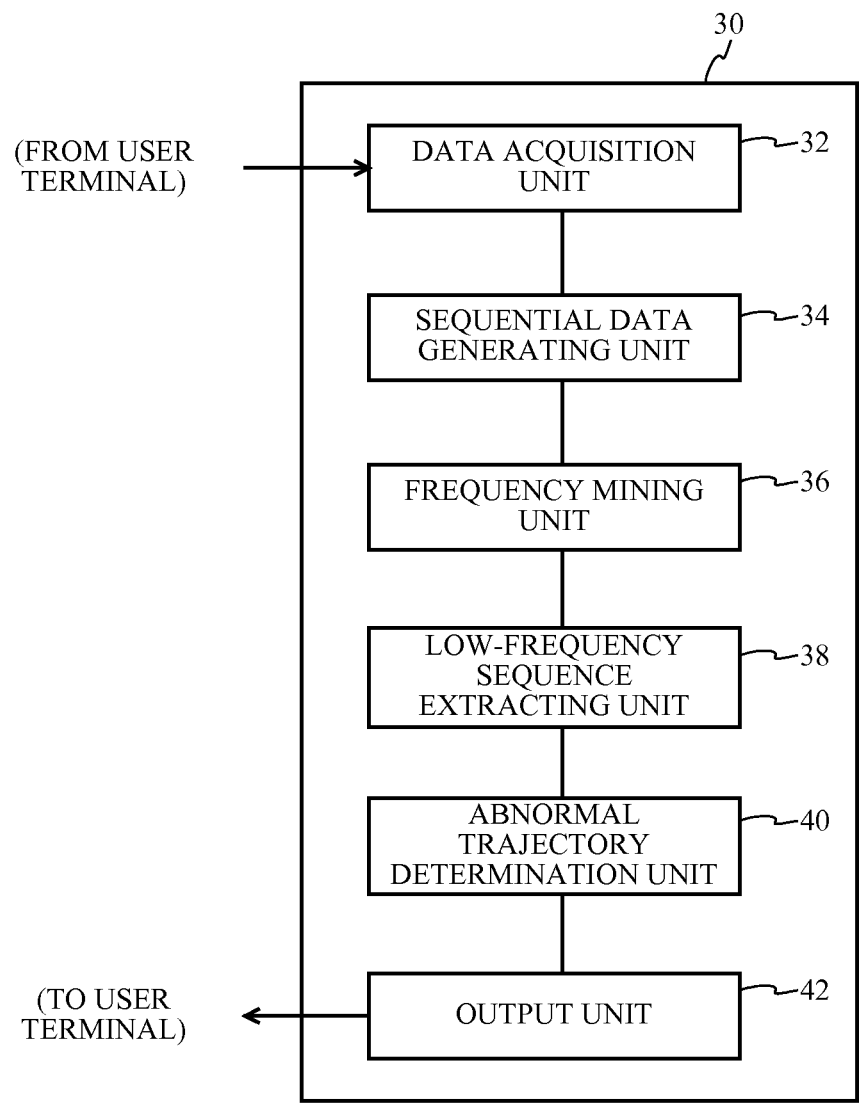
FIG. 5 is a functional block diagram of the server.

FIG. 5 illustrates a functional block diagram of the server 30. As illustrated in FIG. 5, the execution of the program by the CPU 90 allows the server 30 to function as a data acquisition unit 32, a sequential data generating unit 34, a frequency mining unit 36, a low-frequency sequence extracting unit 38, an abnormal trajectory determination unit 40, and an output unit 42.

The data acquisition unit 32 acquires the set T of trajectory data transmitted from the user terminal 20, and transmits it to the sequential data generating unit 34.

Figures 6A, 6B:
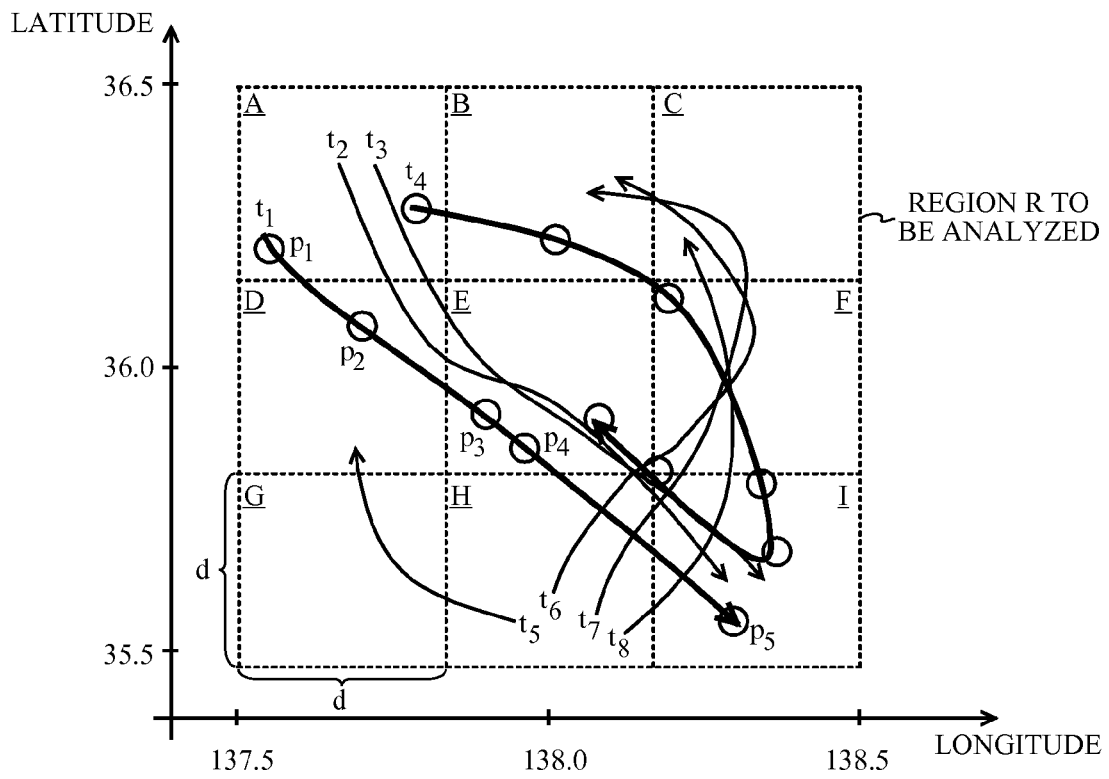
FIG. 6A illustrates a state where a region (region R to be analyzed) including the whole of the set T of trajectory data is divided with a mesh granularity d.
FIG. 6B is a diagram illustrating a set S of sequential data.

The sequential data generating unit 34 divides a region (region R to be analyzed) that includes the whole of the set T of trajectory data with a mesh granularity d as illustrated in FIG. 6A. In addition, the sequential data generating unit 34 assigns an ID (mesh ID=A, B, C . . . ) to each mesh, and converts data included in the set T of trajectory data into sequential data represented with the mesh IDs in accordance with given conversion rules (see FIG. 6B). A set of sequential data after conversion is described as a set S.

The frequency mining unit 36 performs frequent episode mining and frequent sequential pattern mining to the set S of sequential data. The frequent episode mining extracts an episode pattern with an appearance frequency greater than or equal to a given threshold value in the set S of sequential data from episode patterns (described as $A \to \{B, C\}$) including a transition pattern (hereinafter, referred to as "sequential pattern") having an order of items such as $A \to B \to C$ (A, B, and C are exemplary items) and a sequential pattern having a complementary relationship thereto, which has a partly different order of the items, such as $A \to C \to B$, from the order $A \to B \to C$ of the transition pattern. The frequent sequential pattern mining extracts a sequential pattern with an appearance frequency greater than or equal to a given threshold value in the set S of sequential data from sequential patterns having a given order such as $A \to B \to C$.

The low-frequency sequence extracting unit 38 extracts a low-frequency sequential pattern $k_c$ based on processing results of the frequency mining unit 36. The low-frequency sequential pattern $k_c$ means a sequential pattern (order of mesh IDs) included in abnormal sequential data. When the episode pattern (e.g. $A \to \{B, C\}$) extracted by the frequent episode mining includes the sequential pattern (e.g. $A \to B \to C$) extracted by the frequent sequential pattern mining, the low-frequency sequence extracting unit 38 extracts a sequential pattern (e.g. $A \to C \to B$) that is other than the extracted sequential pattern and satisfies a given condition in sequential patterns included in the extracted episode pattern as the low-frequency sequential pattern $k_c$.

The abnormal trajectory determination unit 40 extracts sequential data that matches the low-frequency sequential pattern $k_c$ extracted by the low-frequency sequence extracting unit 38, in other words, sequential data that includes the extracted low-frequency sequential pattern $k_c$ from the set S of sequential data, and decides it as the abnormal trajectory. In addition, the abnormal trajectory determination unit 40 extracts sequential data including a normal sequential pattern corresponding to the low-frequency sequential pattern $k_c$ from the set S of sequential data, and decides it as a normal trajectory.

The output unit 42 outputs the abnormal trajectory and the normal trajectory decided in the abnormal trajectory determination unit 40 to the user terminal 20.

Figure 7:
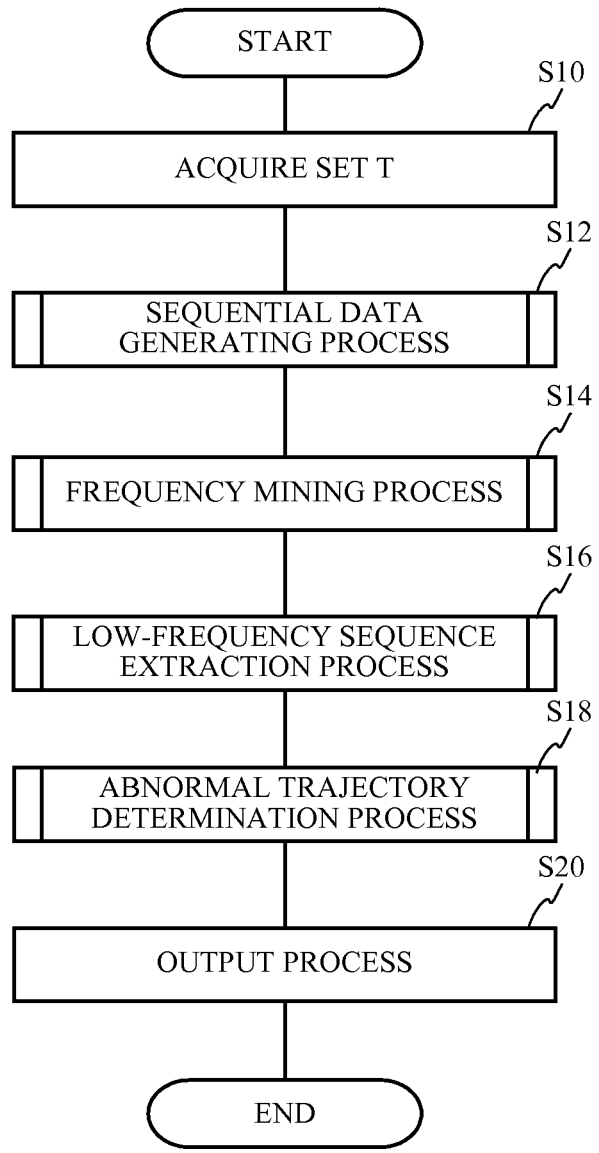
FIG. 7 is a flowchart illustrating a sequence of a process executed by the server.

A detail description will now be given of a process of the server 30 of the present embodiment with reference to FIG. 7 through FIG. 15B. FIG. 7 is a flowchart illustrating a sequence of the process of the server 30. The process illustrated in FIG. 7 starts when the user terminal 20 sends the set T of trajectory data to the data acquisition unit 32.

In the process illustrated in FIG. 7, the data acquisition unit 32 acquires the set T of trajectory data, and transmits the acquired set T to the sequential data generating unit 34 at step S10. At step S12, the sequential data generating unit 34 then performs a sequential data generating process. Next, at step S14, the frequency mining unit 36 performs a frequency mining process. At step S16, the low-frequency sequence extracting unit 38 then performs a low-frequency sequence extraction process, and at step S18, the abnormal trajectory determination unit 40 performs an abnormal trajectory determination process. At step S20, the output unit 42 outputs a determination result from an abnormal trajectory determination process to the user terminal 20.

A detail description will now be given of processes from steps S12 through S18.

(Step S12: Sequential Data Generating Process)

Figure 8:
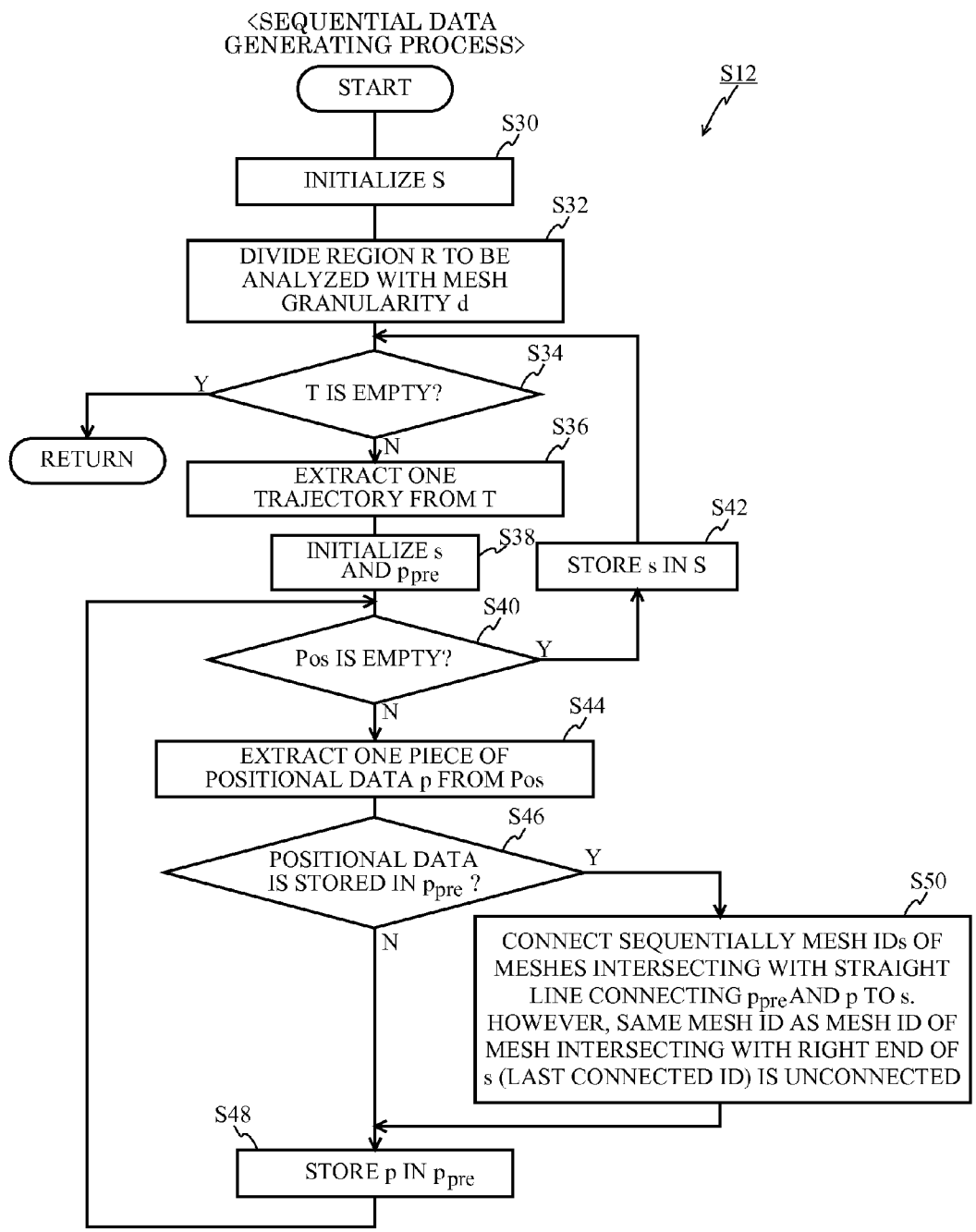
FIG. 8 is a flowchart illustrating a sequential data generating process (step S12) executed by a sequential data generating unit.

A description will first be given of the sequential data generating process (step S12) by the sequential data generating unit 34. At step S12, the process along the flowchart illustrated in FIG. 8 is executed. In the process illustrated in FIG. 8, at step S30, the sequential data generating unit 34 initializes the set S of sequential data.

At step S32, the sequential data generating unit 34 then divides the region R to be analyzed with a mesh granularity d as illustrated in FIG. 6A. The sequential data generating unit 34 assigns an ID to each of the divided meshes (mesh ID=A, B, C . . . ).

At step S34, the sequential data generating unit 34 determines whether the set T of trajectory data is empty. When the determination is Y, i.e. all trajectory data included in the set T is processed, the sequential data generating unit 34 ends the entire process in FIG. 8.

On the other hand, when the determination at step S34 is N, the process moves to step S36. At step S36, the sequential data generating unit 34 extracts one piece of trajectory data t from the set T of trajectory data. For example, the sequential data generating unit 34 extracts trajectory data $t_1$ at the first line from the set T of trajectory data in FIG. 2.

At step S38, the sequential data generating unit 34 initializes s and $p_{pre}$. Here, s represents sequential data, and $p_{pre}$ means positional data previous to the focused positional data that is extracted at step S44.

Then, at step S40, the sequential data generating unit 34 determines whether the positional data Pos illustrated in FIG. 2 is empty. When the determination is N, the process moves to step S44.

At step S44, the sequential data generating unit 34 extracts leading positional data p from the positional data Pos. For example, the sequential data generating unit 34 extracts leading positional data (36.25, 137.55) in the trajectory data $t_1$ ($p_1$ in FIG. 6A).

At step S46, the sequential data generating unit 34 then determines whether positional data is stored in $p_{pre}$. Here, $p_{pre}$ is initialized at step S38, and thus the determination is N, and the process moves to step S48.

At step S48, the sequential data generating unit 34 stores the positional data ($p_1$) in $p_{pre}$. Then, the process goes back to step S40.

Back to step S40, the sequential data generating unit 34 determines whether the positional data Pos illustrated in FIG. 2 is empty. When the determination is N, the process moves to step S44, and the sequential data generating unit 34 extracts leading positional data p from the positional data Pos. For example, the sequential data generating unit 34 extracts the second positional data (36.08, 137.71) in the trajectory data $t_1$ ($p_2$ in FIG. 6A).

Then, at step S46, the sequential data generating unit 34 determines whether positional data is stored in $p_{pre}$. Here, since the positional data $p_1$ is stored in $p_{pre}$ at the previous step S48, the determination becomes Y, and the process moves to step S50.

At step S50, the sequential data generating unit 34 connects sequentially mesh IDs of the meshes intersecting with a straight line connecting $p_{pre}$ (=$p_1$) and the positional data p (=$p_2$) to s. However, the mesh ID that is the same as the mesh ID of the mesh intersecting with the right end of s (last connected ID) is not connected so that the same mesh ID is not continuously output. Here, the straight line connecting the positional data $p_1$ and $p_2$ intersects with the mesh having a mesh ID of A, and thus, "A" is connected to s.

Step S44, S46, and S50 are then repeated to convert the trajectory data $t_1$ into $t_1$=ADEHI. When one piece of trajectory data is converted, the determination at step S40 becomes Y, the process moves to step S42, the sequential data generating unit 34 stores the sequential data s in the set S of sequential data (see FIG. 6B), and the process goes back to step S34.

Step S36 through S50 are repeated until the determination at step S34 becomes Y, and when the set T becomes empty, i.e. when the determination at step S34 becomes Y, the process illustrated in FIG. 8 ends. The above process allows the sequential data of the trajectory data $t_1$ through $t_8$ to be stored in the set S of sequential data as illustrated in FIG. 6B.

(Step S14: Frequency Mining Process)

A description will now be given of the frequency mining process (step S14) by the frequency mining unit 36. As step S14, the process is executed along a flowchart illustrated in FIG. 9.

Figure 9:
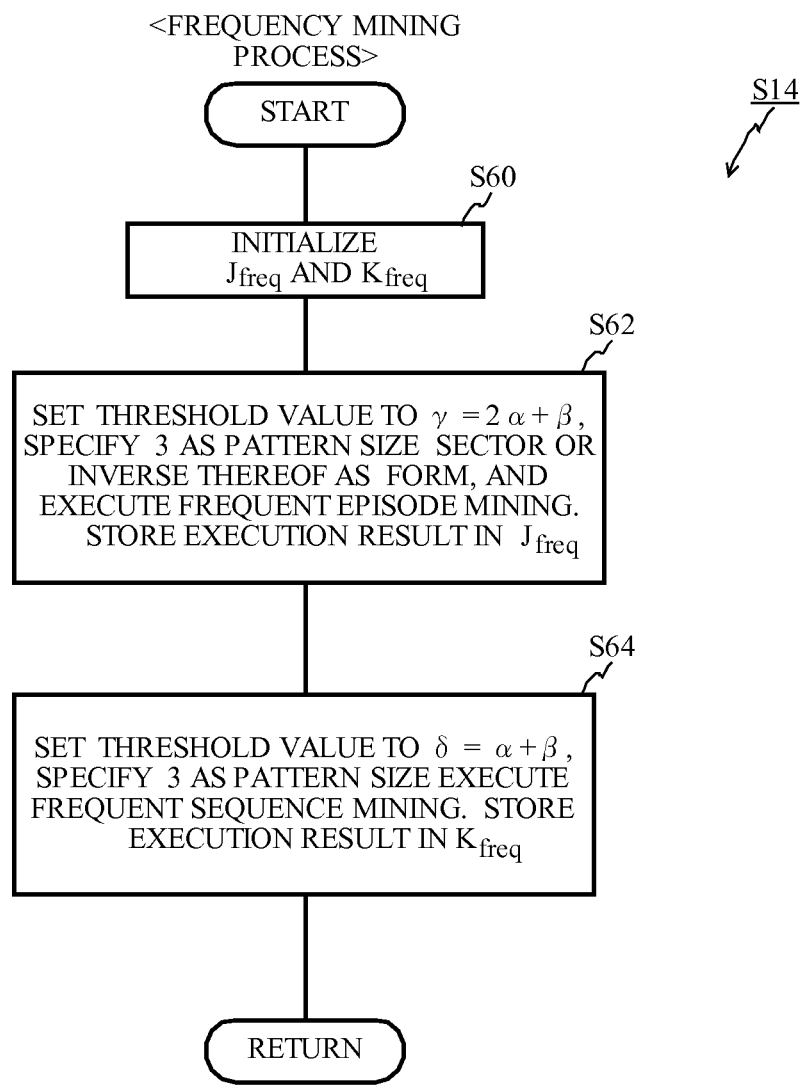
FIG. 9 is a flowchart illustrating a frequency mining process (step S14) executed by a frequency mining unit.

In the process illustrated in FIG. 9, at step S60, the frequency mining unit 36 initializes $J_{freq}$ and $K_{freq}$ that are sets of execution results.

At step S62, the frequency mining unit 36 then sets a threshold value (first frequency) to $\gamma=2\alpha+\beta$, specifies 3 as a pattern size (the number of items), specifies a sector or inverse thereof as a form, and executes the frequent episode mining. The frequency mining unit 36 stores the execution result in $J_{freq}$.

Figure 10A:
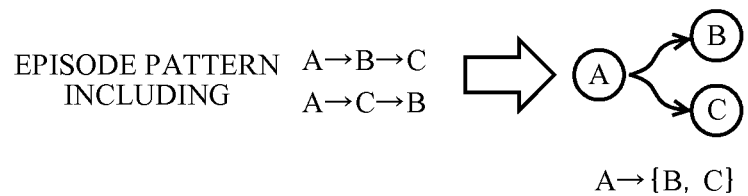
FIG. 10A and FIG. 10B are diagrams illustrating episode patterns to be processed in the embodiment.
Figure 10B:
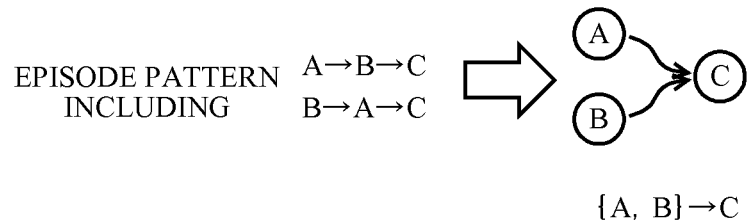

Here, the episode pattern with a pattern size of 3 and a form of sector (or inverse thereof) is an episode pattern illustrated in FIG. 10A or FIG. 10B. More specifically, as illustrated in FIG. 10A, the episode pattern that includes two patterns (A→B→C, A→C→B), each including three items A, B, and C, both having A at the head, and the order of preceding B and C being arbitrary, is described as an sectorial episode pattern A→{B, C}. In addition, as illustrated in FIG. 10B, the episode pattern that includes two patterns, each including three items A, B, and C, both having C at the end, and the order of A and B being arbitrary, (A→B→C, B→A→C) is described as an inverse sectorial episode pattern {A, B}→C.

At step S62, the frequency mining unit 36 mines an episode pattern that can be represented with as A→{B, C} and has an appearance frequency greater than or equal to the threshold value γ (=2α+β) in the set T of sequential data illustrated in FIG. 11A.

Here, α represents the threshold value for an appearance frequency with which the sequential pattern is to be decided as an abnormal sequential pattern from sequential patterns represented with as A→B→C, A→C→B, or the like (pattern with a determined order). In addition, β represents the threshold value for a difference between appearance frequencies of a sequential pattern (e.g. A→B→C) to be decided as an abnormal sequential pattern and a sequential pattern (e.g. A→C→B) having a complementary relationship to the sequential pattern, i.e. a sequential pattern included in the same episode pattern. When α is set to 1 and β is set to 2, the threshold value γ used at step S62 is 4 (γ=2·1+2=4).

FIG. 11B illustrates results of the frequent episode mining executed with a threshold value γ of 4. In the present example, A→{E, I}, which is indicated by a bold frame in FIG. 11B, is extracted as the episode pattern with an appearance frequency greater than or equal to the threshold value γ=4.

Back to FIG. 9, at step S64, the frequency mining unit 36 sets a threshold value (second frequency) to δ=α+β, specifies 3 as a pattern size, and executes the frequent sequential pattern mining. In this case, the frequency mining unit 36 extracts a sequential pattern with an appearance frequency greater than or equal to the threshold value δ=3 from sequential patterns represented with as "A→B→C" and the like in the set S of sequential data. The frequency mining unit 36 stores execution results in $K_{freq}$.

In this case, when α is 1 and β is 2, the threshold value δ becomes 3 (δ=1+2=3).

FIG. 11C illustrates results of the frequent sequential pattern mining that sets the threshold value δ to 3 at step S64. In the present example, A→E→I, A→F→I, and H→F→C, which are indicated by a bold frame in FIG. 11C, are extracted as a sequential pattern with an appearance frequency greater than or equal to the threshold value δ=3.

(Step S16: Low-frequency Sequence Extraction Process)

A description will now be given of the low-frequency sequence extraction process (step S16) by the low-frequency sequence extracting unit 38. At step S16, the process is executed along the flowchart illustrated in FIG. 12.

Figure 12:
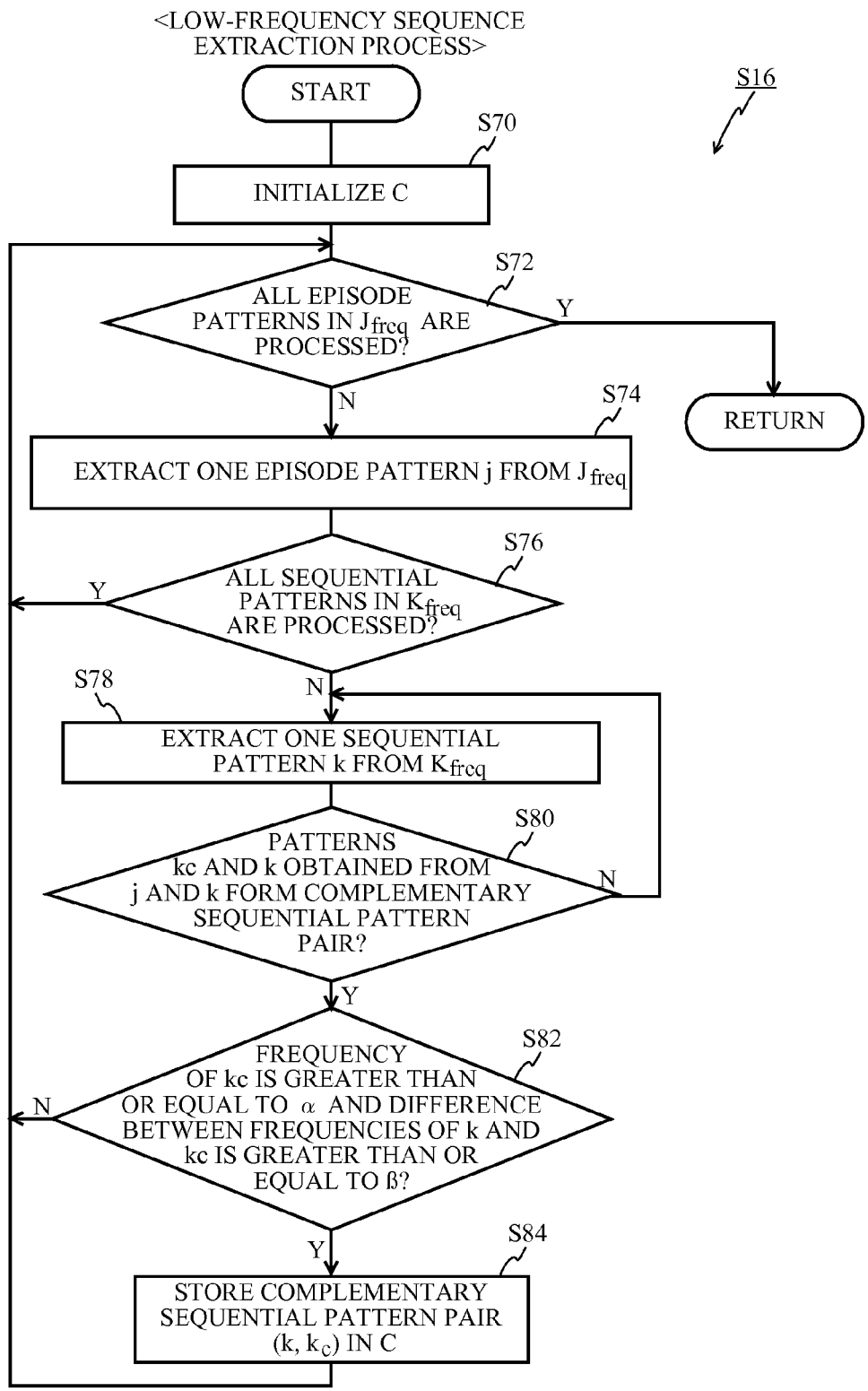
FIG. 12 is a flowchart illustrating a low-frequency sequence extraction process (step S16) executed by a low-frequency sequence extracting unit.

In the process in FIG. 12, at step S70, the low-frequency sequence extracting unit 38 initializes a set C of complementary sequential pattern pairs. At step S72, the low-frequency sequence extracting unit 38 then determines whether all episode patterns in the set $J_{freq}$, which is a set of results of the frequent episode mining, are processed. When the determination is N, the process moves to step S74.

At step S74, the low-frequency sequence extracting unit 38 extracts one episode pattern j from the set $J_{freq}$ of the execution results of the frequent episode mining. Here, the episode pattern A→{E, I} with an appearance frequency greater than or equal to the threshold value γ=4, which is indicated with a solid line arrow in FIG. 13A, is extracted from the execution results of the frequent episode mining.

At step S76, the low-frequency sequence extracting unit 38 then determines whether all sequential patterns in the set $K_{freq}$, which is a set of execution results of the frequent sequential pattern mining, are processed. When the determination is N, the process moves to step S78.

At step S78, the low-frequency sequence extracting unit 38 extracts one sequential pattern k from the set $K_{freq}$ of the execution results of the frequent sequential pattern mining.

Figures 13A, 13B, 13C:
FIG. 13A through FIG. 13C are diagrams for explaining the process executed by the low-frequency sequence extracting unit.

For example, the low-frequency sequence extracting unit 38 extracts A→E→I indicated with a dashed line arrow in FIG. 13B.

At step S80, the low-frequency sequence extracting unit 38 determines whether the patterns $k_c$ and k obtained from j and k form a complementary sequential pattern pair. Here, the low-frequency sequence extracting unit 38 decides a sequential pattern other than the sequential pattern k as $k_c$ in the sequential patterns included in the episode pattern j based on the episode pattern j and the sequential pattern k. As described above, when the episode pattern j is A→{E, I} and the sequential pattern k is A→E→I, obtained as the sequential pattern $k_c$ is A→I→E. Then, the low-frequency sequence extracting unit 38 compares the sequential patterns k and $k_c$, and determines whether the sequential pattern k: A→E→I and the sequential pattern $k_c$: A→I→E form a complementary sequential pattern pair. In the above example, the sequential pattern k: A→E→I and the sequential pattern $k_c$: A→I→E form a complementary sequential pattern pair, and thus the determination at step S80 becomes Y, and the process moves to step S82.

When A→F→I is extracted as the sequential pattern k at step S78 for example, the pattern $k_c$ can not be obtained from the episode pattern j and the sequential pattern k at step S80. In such a case, the determination at step S80 becomes N, and the process goes back to step S78.

When the determination at step S80 is Y and the process goes to step S82, the low-frequency sequence extracting unit 38 determines whether the frequency of the sequential pattern $k_c$ is greater than or equal to α (=1) and the difference between frequencies of k and $k_c$ is greater than or equal to β (=2). When the determination at step S82 is N, the process goes back to step S72, but when the determination is Y, the process goes to step S84. In a case of the sequential pattern $k_c$: A→I→E, the determination becomes Y because the appearance frequency is 1 as illustrated in FIG. 13B, and the process goes to step S84.

At step S84, the low-frequency sequence extracting unit 38 stores the complementary sequential pattern pair (k, $k_c$) in C (see FIG. 13C), and the process goes back to step S72.

The process and determination after step S72 are repeated until the determination at step S72 becomes N, and the process in FIG. 12 ends when the determination at step S72 becomes N. The remaining sequential patterns A→F→I and H→F→C illustrated in FIG. 13B do not generate the sequential pattern $k_c$ with the episode pattern A→{E, I}, and thus the complementary sequential pattern pair (k, $k_c$) is not stored in C based on these remaining sequential patterns.

(Step S18: Abnormal Trajectory Determination Process)

A description will now be given of the abnormal trajectory determination process (step S18) by the abnormal trajectory determination unit 40. At step S18, the process is executed along the flowchart illustrated in FIG. 14.

Figure 14:
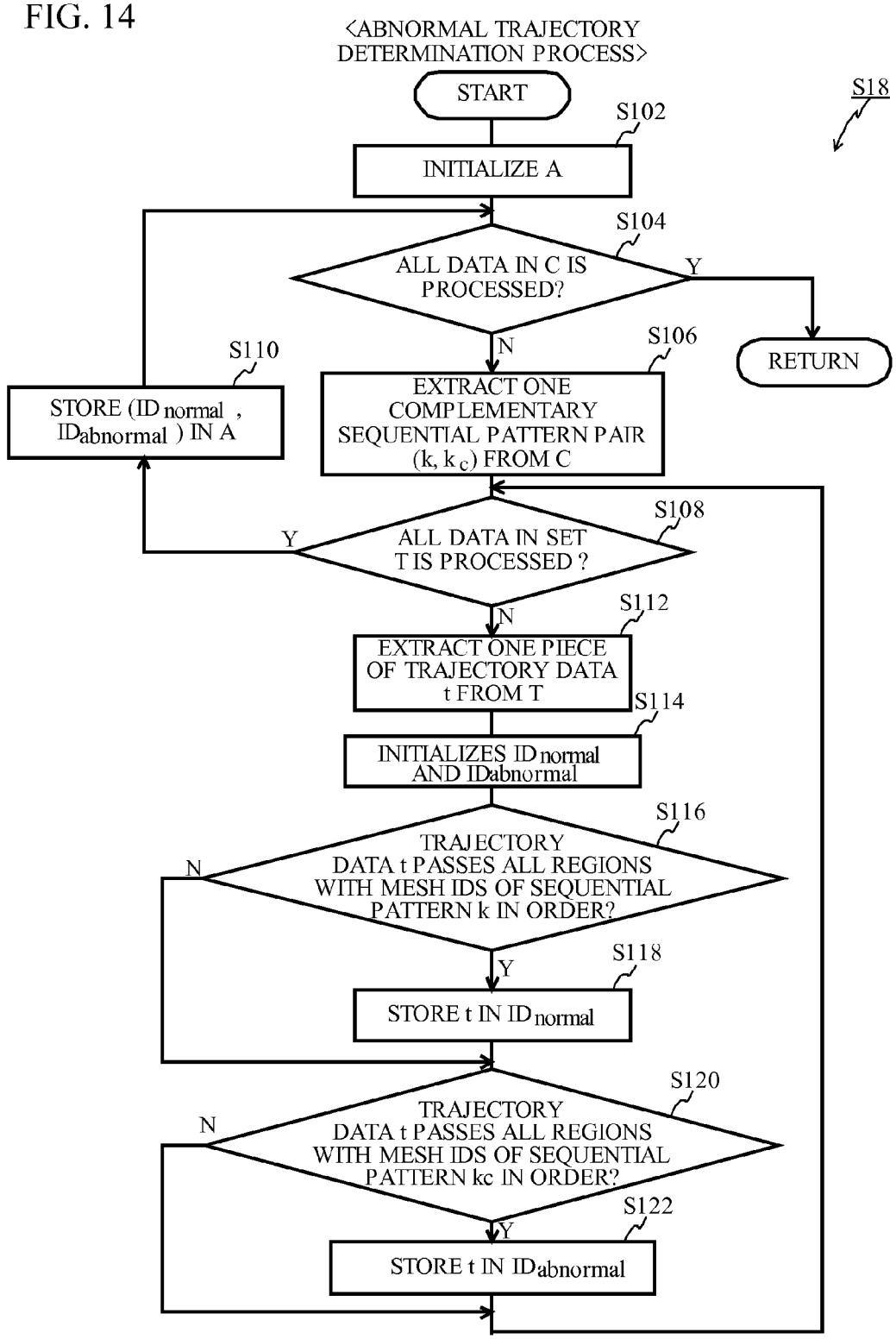
FIG. 14 is a flowchart illustrating an abnormal trajectory determination process (step S18) executed by an abnormal trajectory determination unit.

In the process illustrated in FIG. 14, at step S102, the abnormal trajectory determination unit 40 initializes a set A. At step S104, the abnormal trajectory determination unit 40 then determines whether all data in C (the complementary sequential pattern pairs stored by the process in FIG. 12) is processed. When the determination is N, the process goes to step S106.

At step S106, the abnormal trajectory determination unit 40 extracts one complementary sequential pattern pair (k, $k_c$) from C. Here, assume that the abnormal trajectory determination unit 40 extracts (k, $k_c$)=(A→E→I, A→I→E) illustrated in FIG. 13C.

At step S108, the abnormal trajectory determination unit 40 determines whether all data in the set T of trajectory data (FIG. 2) is processed. When the determination is N, the process goes to step S112.

At step S112, the abnormal trajectory determination unit 40 extracts one piece of trajectory data t from the set T. Here, the trajectory data $t_1$ is extracted for example.

At step S114, the abnormal trajectory determination unit 40 then initializes $ID_{normal}$ and $ID_{abnormal}$. At step S116, the abnormal trajectory determination unit 40 determines whether the trajectory data t passes all the regions with the mesh IDs of the sequential pattern k included in the complementary sequential pattern pair (k, $k_c$) in the order. When the determination is Y, the process goes to step S118, the abnormal trajectory determination unit 40 stores t in $ID_{normal}$, and the process moves to step S120. On the other hand, when the determination at step S116 is N, the process skips step S118, and moves to step S120.

At step S120, the abnormal trajectory determination unit 40 determines whether the trajectory data t passes all the regions with the mesh IDs of the sequential pattern $k_c$ included in the complementary sequential pattern pair (k, $k_c$) in the order. When the determination is Y, the process moves to step S122, and the abnormal trajectory determination unit 40 stores t in $ID_{abnormal}$, and goes back to step S108. On the other hand, when the determination at step S120 is N, the process skips step S122 and goes back to step S108.

In the present embodiment, the trajectory data $t_1$ is $t_1$=ADEHI and passes all the regions with the mesh IDs of the pattern pair k=A→E→I in the order thereof, and thus $t_1$ is stored in $ID_{normal}$ at step S118.

When the process goes back to step S108, the abnormal trajectory determination unit 40 determines whether all data in the set T of trajectory data (FIG. 2) is processed. When the determination is Y, the process moves to step S110, and the abnormal trajectory determination unit 40 stores ($ID_{normal}$, $ID_{abnormal}$) in the set A. The process then goes back to step S104. In the present embodiment, each of the trajectory data $t_1$ through $t_8$ is determined whether it includes the sequential pattern k or $k_c$ as illustrated in FIG. 15A. In this case, $t_1$, $t_2$, and $t_3$ indicated with bold solid lines on the coordinate plane in FIG. 15A are stored in $ID_{normal}$ in the set A (see FIG. 15B). In addition, $t_4$ indicated with a bold dashed line on the coordinate plane in FIG. 15A is stored in $ID_{abnormal}$ in the set A (see FIG. 15B).

Back to FIG. 14, at step S104, the abnormal trajectory determination unit 40 determines whether all data in the set C (the complementary sequential pattern pairs stored by the process in FIG. 12) is processed as described above. When the determination is N, the process after step S106 are executed as described above. On the other hand, when the determination at step S104 is Y, the process of FIG. 14 ends.

The output unit 42 outputs the set A of pairs of a normal trajectory and an abnormal trajectory illustrated in FIG. 15B to the user terminal 20 (step S20 in FIG. 7).

Here, a description will be given of the reason why the threshold value γ for the frequent episode mining is set to γ=2α+β and the threshold value δ for the frequent sequential pattern mining is set to δ=α+β.

When the complementary sequential pattern pair (k, $k_c$) exists, both the sequential patterns k and $k_c$ have appearance frequencies greater than or equal to α. In addition, when k represents the sequential pattern with a higher appearance frequency between the sequential patterns k and $k_c$, the difference between appearance frequencies of the sequential patterns k and $k_c$ is greater than or equal to β, and thus α+β is proper for the threshold value (δ).

In addition, when the number of trajectory data that matches the sequential pattern k is represented with |k|, the number of trajectory data that matches the sequential pattern $k_c$ is represented with |$k_c$|, and the number of trajectory data that matches the episode pattern j corresponding to the sequential patterns k and $k_c$ is represented with |j|, |j|≥|k|+|$k_c$| holds true when the complementary sequential pattern pair is formed. Moreover, the $k_c$ is a pattern with a frequency greater than or equal to α. Therefore, γ=2α+β is proper for the threshold value (γ) used for the frequent episode mining.

The threshold values γ and δ determined as described above allow the frequent episode mining and the frequent sequential pattern mining to be executed properly. That is to say, suppressed is a detection omission of (k, $k_c$) caused by making the threshold values greater than the above described values and the occurrence of the extra process caused by making the threshold values less than the above described values. When the threshold values γ and δ are determined as described above, step S82 in FIG. 12 can be omitted. In this case, when the determination at step S80 becomes Y, the process may directly go to step S84.

As described above, the present embodiment demonstrates that the frequency mining unit 36 extracts an episode pattern with an appearance frequency greater than or equal to the threshold value γ by the frequent episode mining and extracts a sequential pattern with an appearance frequency greater than or equal to the threshold value δ by the frequent sequential pattern mining in the set S of sequential data. The low-frequency sequence extracting unit 38 specifies, when a sequential pattern corresponding to the extracted episode pattern is extracted, a sequential pattern other the extracted sequential pattern from sequential patterns included in the episode pattern, and decides an abnormal sequential pattern from the specified sequential pattern. The above process allows the present embodiment to reduce the calculation amount and calculation time for deciding the abnormal sequential pattern because the use of the frequent episode mining and the frequent sequential pattern mining enables to narrow sequential patterns that may be the abnormal sequential pattern, i.e. to exclude the disinterested sequential pattern. Therefore, the present embodiment can improve the efficiency of the process.

Here, a description will be given of a case where only the frequent sequential pattern mining is used (comparison example: Patent Document 1). In the comparison example, assume that the frequent sequential pattern mining extracts a sequential pattern of A→E→I as a high-frequency sequential pattern (see FIG. 6A, FIG. 6B, and the like). In this case, the server 30 needs to examine frequencies of all sequential patterns with different orders from A→E→I (A→I→E, I→A→E, I→E→A, E→A→I, E→I→A), and to extract even a low-frequency sequential pattern when it has an appearance frequency, for example, greater than or equal to 1. As described above, the comparison example is inefficient in the calculation amount and the calculation time because sequential patterns to be examined increase, but the method of the present embodiment can reduce the calculation amount and the calculation time.

In addition, the present embodiment does not process an episode pattern with an appearance frequency less than or equal to the threshold value 3 illustrated in FIG. 13A at all, and thus is efficient from this aspect.

In addition, the present embodiment determines the episode pattern extracted by the frequent episode mining to have an appearance frequency greater than or equal to γ (=2α+β), and determines the episode pattern extracted by the frequent sequential pattern mining to have an appearance frequency of greater than or equal to δ (=α+β). This enables to properly narrow sequential patterns that may be an abnormal sequential pattern.

The above described embodiment describes a sectorial episode pattern illustrated in FIG. 10A as an example, but does not intend to suggest any limitation, and an inverse sectorial episode pattern illustrated in FIG. 10B may be used.

The above described embodiment demonstrates that the output unit 42 outputs a pair of the normal trajectory and the abnormal trajectory to the user terminal 20, but does not intend to suggest any limitation, and the output unit 42 may output only the information about the abnormal trajectory to the user terminal 20.

The above embodiment adopts the information processing system 100 to traffic field, but does not intend to suggest any limitation, and the information processing system 100 may be adopted to detect abnormal trail data in BPM (Business Process Management) field. For example, when the business process usually flows as "issue→check→approval by department chief→approval by manager→order", the information processing system of the above described embodiment can be used to detect a trail pattern that has a flow of "issue→check→approval by manager→approval by department chief→order".

The above described embodiment demonstrates that the server 30 executes the process in FIG. 7, but does not intend to suggest any limitation, and the user terminal 20 may execute the process in FIG. 7.

The above described processing function can be achieved by a computer. In that case, a program in which the process of the function that the processing device is to have is written is provided. The execution of the program by the computer allows the above described processing function to be achieved on the computer. The program in which the process is written may be stored in a computer readable storage medium (however, transitory storage medium, e.g. carrier, is excluded).

The program is distributed by selling a portable storage medium such as a DVD (Digital Versatile Disc) and a CD-ROM (Compact Disc Read Only Memory) in which the program is stored. In addition, the program may be stored in a storage medium in a server computer, and transferred to other computers from the server computer through the network.

The computer executing the program stores the program stored in a portable storage medium or the program transferred from the server computer in the storage device thereof. The computer then reads out the program from the storage device thereof and executes the process following the program. The computer may directly read out the program from the portable storage medium, and execute the process following the program. The computer may execute the process following the program every time when the program is transferred from the server computer.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A method for detecting an abnormal transition pattern from a first transition pattern representing an order of items, the method comprising:

first extracting at least one second episode pattern as a first episode pattern from one or more episode patterns, the first episode pattern having an appearance frequency greater than or equal to a first frequency, each of the one or more second episode patterns being represented with a description form so that the second episode pattern includes a-second transition pattern and a third transition pattern, the second transition pattern including items identical to items of the third transition pattern, an order of the items partially differing between the second transition pattern and the third transition pattern so that the third transition pattern has a complementary relation to the second transition pattern;

second extracting a fourth transition pattern from the first transition pattern, the fourth transition pattern having an appearance frequency greater than or equal to a second frequency; and specifying a fifth transition pattern from the second transition pattern and the third transition pattern included in the first episode pattern, the fifth transition pattern being other than the fourth transition pattern, to determine the abnormal transition pattern based on the fifth transition pattern when the fourth transition pattern includes a sixth transition pattern corresponding to the first episode pattern.

2. The method of claim 1, wherein
the first frequency is 2α+β, and
the second frequency is α+β
where α represents a threshold value for an appearance frequency of a transition pattern to be decided as the abnormal transition pattern, and
β represents a threshold value for a difference between appearance frequencies of the transition pattern to be decided as the abnormal transition pattern and a transition pattern having a complementary relationship to the transition pattern.

3. The method of claim 1, wherein
each of the second transition pattern and the third transition pattern includes three different items, and
a first or third item in the order of the items of the second transition pattern is identical to that in the order of the items of the third transition pattern.

4. The method of claim 1, wherein
frequent episode mining is performed in the first extracting, and
frequent sequential pattern mining is performed in the second extracting.

5. The method of claim 1, wherein the abnormal transition pattern is to be used to determine abnormal data.

6. A computer readable medium storing a program causing a computer to execute a process for detecting an abnormal transition pattern from a first transition pattern representing an order of items, the process comprising:

extracting at least one second episode pattern as a first episode pattern from one or more second episode patterns, the first episode pattern having an appearance frequency greater than or equal to a first frequency, each of the one or more second episode patterns being represented with a description form so that the second episode pattern includes a-second transition pattern and a third transition pattern, the second transition pattern including items identical to items of the third transition pattern, an order of the items partially differing between the second transition pattern and the third transition pattern so that the third transition pattern has a complementary relation to the second transition pattern;

extracting a fourth transition pattern from the first transition pattern, the fourth transition pattern having an appearance frequency greater than or equal to a second frequency; and specifying a fifth transition pattern from the second transition pattern and the third transition pattern included in the first episode pattern, the fifth transition pattern being other than the fourth transition pattern, to determine the abnormal transition pattern based on the fifth transition pattern when the fourth transition pattern includes a sixth transition pattern corresponding to the first episode pattern.

7. The computer readable medium of claim 6, wherein
the first frequency is $2\alpha+\beta$, and
the second frequency is $\alpha+\beta$
where $\alpha$ represents a threshold value for an appearance frequency of a transition pattern to be decided as the abnormal transition pattern, and
$\beta$ represents a threshold value for a difference between appearance frequencies of the transition pattern to be decided as the abnormal transition pattern and a transition pattern having a complementary relationship to the transition pattern to be decided as the abnormal transition pattern.

8. The computer readable medium of claim 6, wherein
each of the second transition pattern and the third transition pattern includes three different items, and
a first or third item in the order of the items of the second transition pattern is identical to that in the order of the items of the third transition pattern.

9. The computer readable medium of claim 6, wherein
frequent episode mining is performed in the extracting an episode pattern, and
a frequent sequential pattern mining is performed in the extracting a third transition pattern.

10. The computer readable medium of claim 6, wherein
the abnormal transition pattern is to be used to determine abnormal data.

11. An apparatus for detecting an abnormal transition pattern from a first transition pattern representing an order of items, the apparatus comprising:

a first extracting unit that extracts at least one second episode pattern as a first episode pattern from one or more second episode patterns, the first episode pattern having an appearance frequency greater than or equal to a first frequency, each of the one or more second episode patterns being represented with a description form so that the second episode pattern includes a second transition pattern and a third transition pattern, the second transition pattern including items identical to items of the third transition pattern, an order of the items differing between the second transition pattern and the third transition pattern so that the-third transition pattern has a complementary relation to the second transition pattern;

a second extracting unit that extracts a fourth transition pattern from the first transition pattern, the fourth transition pattern having an appearance frequency greater than or equal to a second frequency; and a determination unit that specifies a fifth transition pattern from the second transition pattern and the third transition pattern included in the first episode pattern, the fifth transition pattern being other than the fourth transition pattern, and determines the abnormal transition pattern based on the fifth transition pattern when the fourth transition pattern includes a sixth transition pattern corresponding to the first episode pattern.

12. The apparatus of claim 11, wherein
the first frequency is $2\alpha+\beta$, and
the second frequency is $\alpha+\beta$
where $\alpha$ represents a threshold value for an appearance frequency of a transition pattern to be decided as the abnormal transition pattern, and
$\beta$ represents a threshold value for a difference between appearance frequencies of the transition pattern to be decided as the abnormal transition pattern and a transition pattern having a complementary relationship to the transition pattern to be decided as the abnormal transition pattern.

13. The apparatus of claim 11, wherein
each of the second transition pattern and the third transition pattern includes three different items,
a first or third item in the order of the items of the second transition pattern is identical to that in the order of the items of the third transition pattern.

14. The apparatus of claim 11, wherein
the first extracting unit uses frequent episode mining, and
the second extracting unit uses frequent sequential pattern mining.

15. The apparatus of claim 11, wherein
the abnormal transition pattern is to be used to determine abnormal data.

* * * * *